United States Patent [19]

Banner

[11] Patent Number: 4,459,742

[45] Date of Patent: Jul. 17, 1984

[54] ARMATURE WINDING MACHINE AND METHOD

[75] Inventor: Alvin C. Banner, Kettering, Ohio

[73] Assignee: The Globe Tool & Engineering Company, Dayton, Ohio

[21] Appl. No.: 368,888

[22] Filed: Apr. 15, 1982

[51] Int. Cl.³ .......................................... H02K 15/09
[52] U.S. Cl. ...................................... 29/597; 29/598; 29/735; 242/7.03; 242/7.05 B
[58] Field of Search ................. 29/597, 598, 733, 735; 242/7.05 R, 7.05 A, 7.05 B, 7.05 C, 7.03

[56] References Cited

U.S. PATENT DOCUMENTS

| | | | |
|---|---|---|---|
| Re. 27,893 | 1/1974 | Miller | 310/234 |
| Re. 28,582 | 10/1975 | Dammar | 29/596 |
| 2,306,855 | 12/1942 | Allen . | |
| 3,156,037 | 10/1964 | Warner | 29/205 |
| 3,231,206 | 1/1966 | Moore | 242/13 |
| 3,455,009 | 7/1969 | Moore | 29/735 |
| 3,474,515 | 10/1969 | Dammar | 29/205 |
| 3,673,878 | 7/1972 | Biddison | 74/125.5 |
| 3,785,580 | 1/1974 | Kennedy et al. | 242/7.05 B |
| 3,857,172 | 12/1974 | George et al. | 29/597 |
| 3,892,366 | 7/1975 | Ott | 242/7.05 B |
| 3,921,284 | 11/1975 | Bucholtz et al. | 29/597 |
| 3,927,469 | 12/1975 | Dammar | 29/597 |

FOREIGN PATENT DOCUMENTS 687484  3/1965  Italy ................................. 310/233

OTHER PUBLICATIONS

The Globe Tool & Engineering Company, Drawing No. 66541, dated Jul. 22, 1963, titled Tamper Assembly.

*Primary Examiner*—Carl E. Hall
*Attorney, Agent, or Firm*—Dybvig & Dybvig

[57] ABSTRACT

To increase the slot fill of armatures wound on a flier type armature winding machine of the type having inner and outer commutator shields, the outer shield is retracted during a portion of each winding cycle for each coil to permit the rotating fliers to draw the wires nearer to the armature shaft and thus deeper into the coil receiving slots. The inner shield, which has notches for exposing a pair of commutator hooks, is rotated to position the notches outside of the paths of the wire when the outer shield is retracted. A tamper assembly is provided for engaging the coil ends immediately after they are wound. The tamper assembly includes tamper rods slidably supported by the winding forms and also includes actuators for pushing the tamper rods into engagement with the coil ends. The tamper assembly may be operated after each winding cycle or only after selected winding cycles. The tamper assembly is designed to cause the coil sides to be pushed into locations more centrally of, and deeper into, the coil receiving slots than naturally occurs by the operation of the fliers.

8 Claims, 11 Drawing Figures

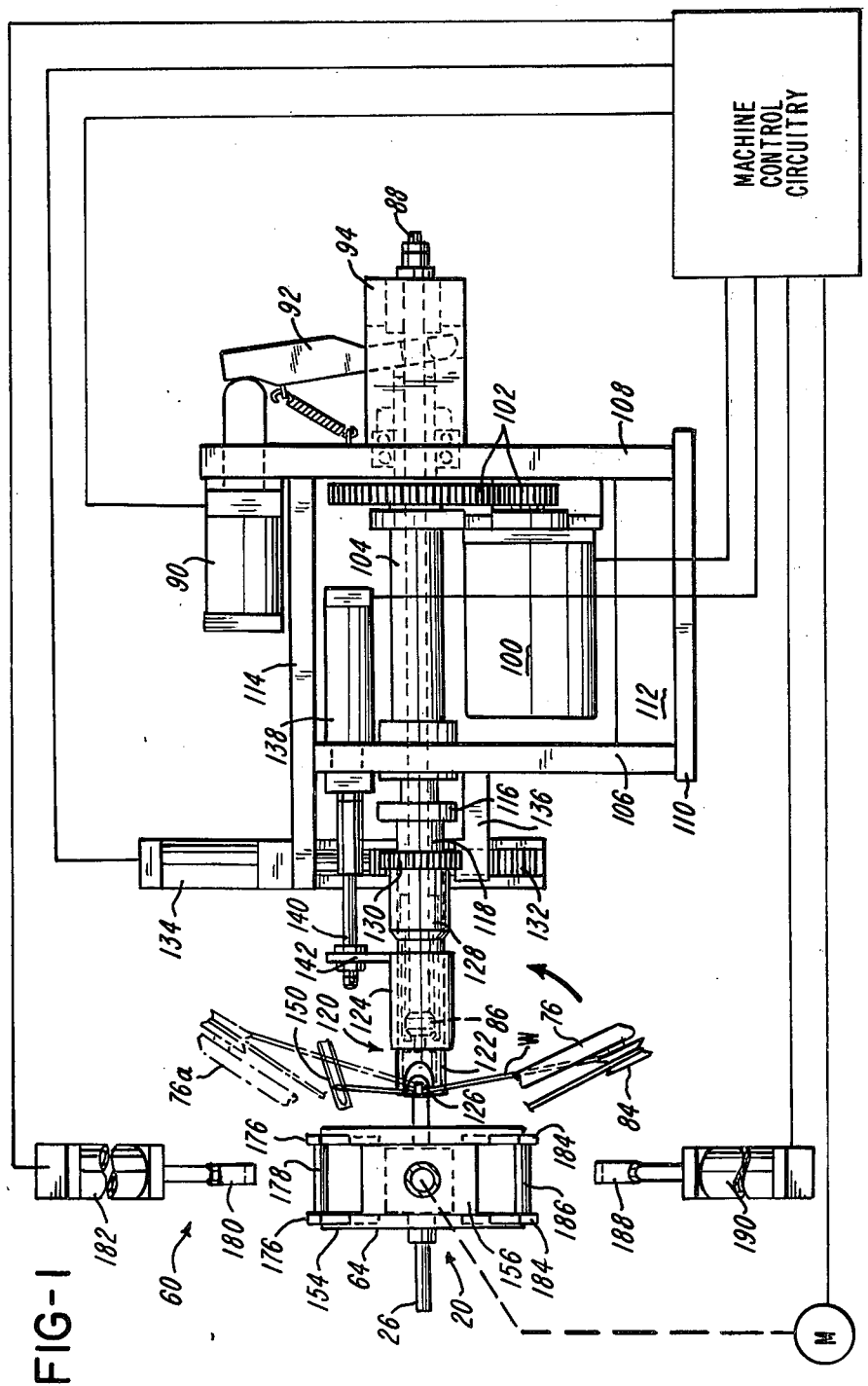

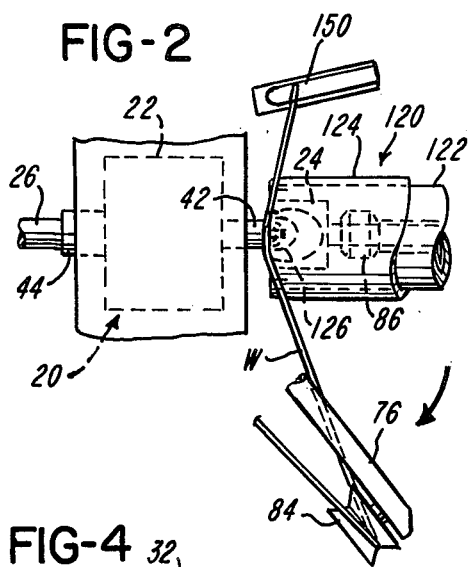
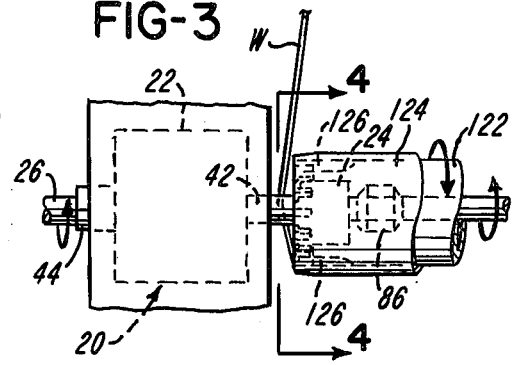
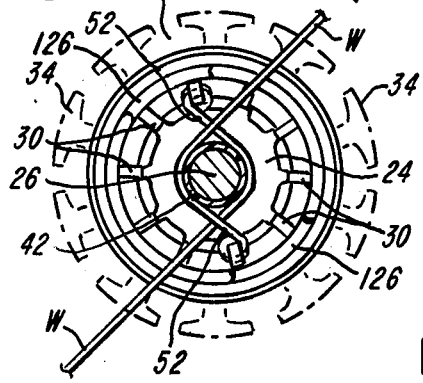
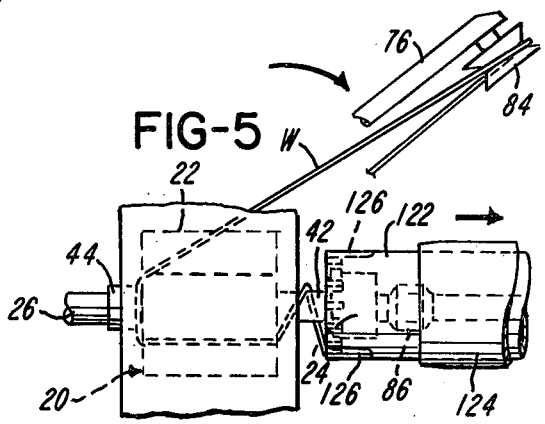
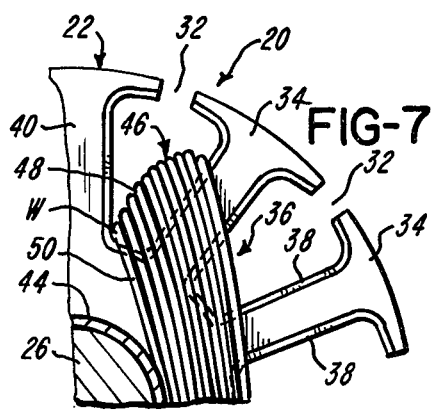
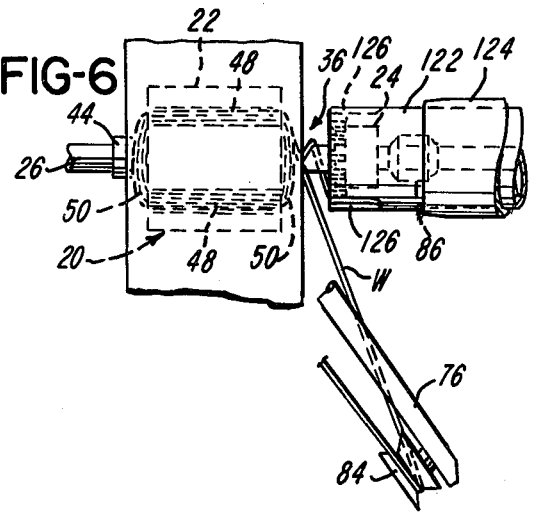

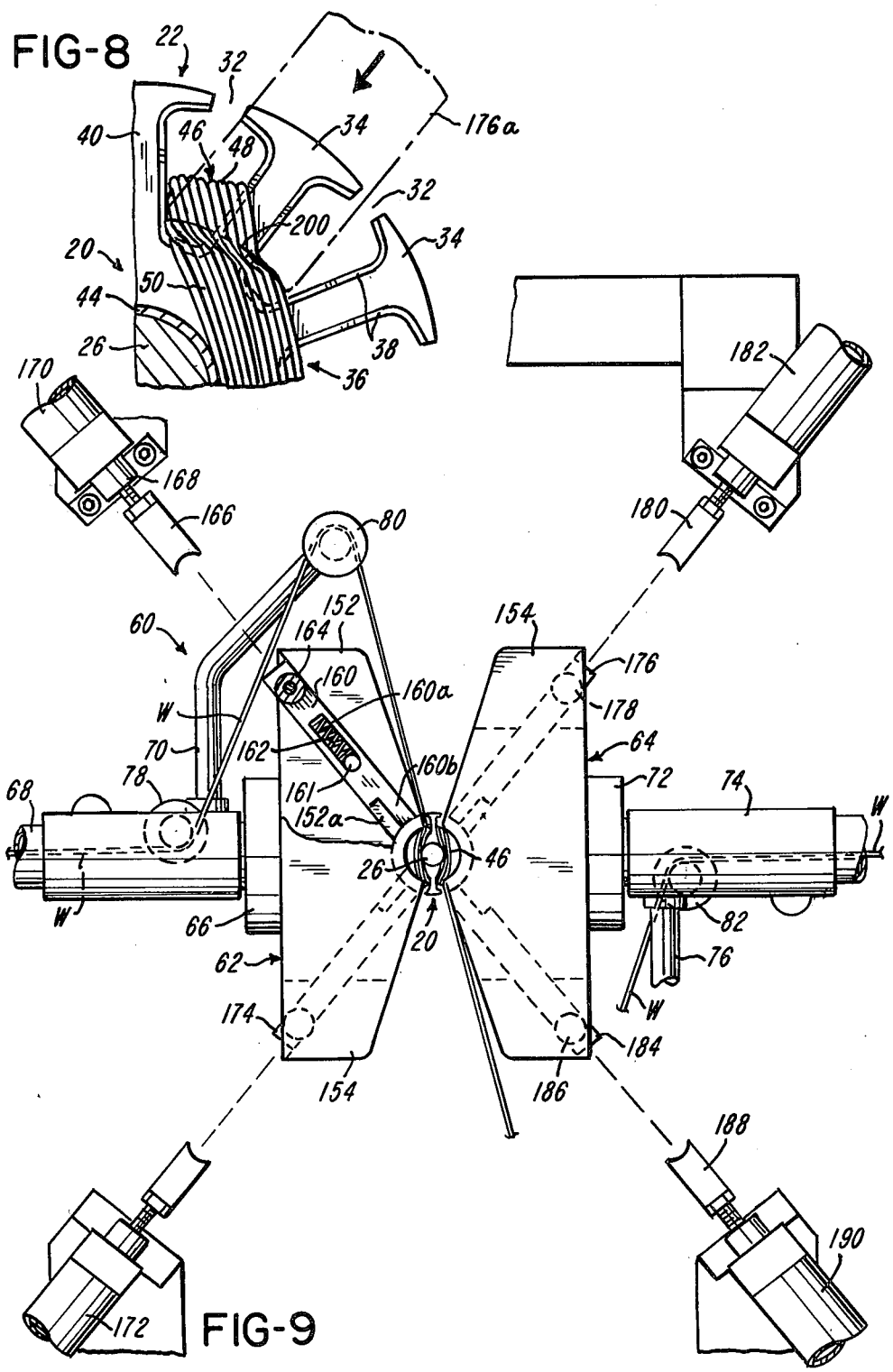

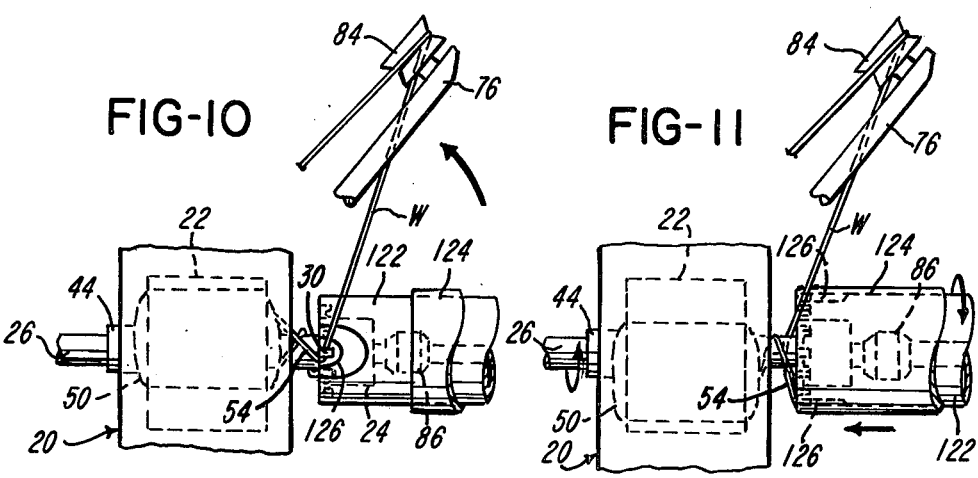

ARMATURE WINDING MACHINE AND METHOD

BACKGROUND OF THE INVENTION

This invention relates to an armature winding machine and method and especially to an automatic double flier winding machine and method. As will become apparent, the invention is equally applicable to single flier winding machines.

The power obtainable from an electric motor depends in part upon the cross-sectional area of the conductive wire located in the coil receiving slots of the motor armature. In general, the power obtainable may be optimized for an armature having coil receiving slots of a given cross-sectional area by maximizing the percentage of the cross-sectional area of the slot that is filled with conductor. This invention is concerned primarily with an armature winding machine and method designed to maximize the "slot fill" or cross-sectional area of conductive wire in the coil receiving slots of the armatures being wound.

Through experience it has been found that the maximum slot fill (cross-sectional area of conductive wire within a slot divided by the cross-sectional area of the slot available to receive wire) is approximately 55%. The remaining approximately 45% of the slot cross-sectional area is filled by gaps inherently caused by the wire and slot shapes. Armatures automatically wound by double flier winders typically have a slot fill of approximately 40%. In some cases, it has been possible to achieve a slot fill on the order of 46% to 47% by the exercise of great care in the construction of the tooling, such high slot fill being partly dependent upon the overall design of the armature. In contrast, the invention described herein may be used to produce armatures having a slot fill on the order of 53% to 54%. Thus this invention may be used to achieve nearly a maximum possible slot fill. Although the percentage increase in slot fill may appear to be small, this invention enables the production of significantly more compact electric motors having a higher power to armature diameter ratio than was previously possible using conventional flier type, automatic armature winders.

This invention is primarily intended to be used as an improvement upon double flier armature winding machines for winding armatures having commutators with lead wire receiving hooks. It is now conventional in such armature winding machines to have a shield assembly including an inner shield and an outer shield. The inner shield is notched to expose a pair of commutator hooks for making lead wire connections. The outer shield covers the commutator hooks exposed through the inner shield notches to prevent the wire segments extending from the fliers from engaging the aforementioned commutator hooks, the outer shield being retracted from the path of the wire segments when the lead wire connections are to be made.

I have found that the presence of the outer shield may substantially interfere with the capability of the armature winding machine to achieve a maximum slot fill because the wire segment between the armature core and a flier necessarily follows a tortuous path extending partially along surfaces of the outer shield. In many cases the diameter of the outer shield is sufficiently large that it creates an impediment to movement of the wire segment and a portion of the wire segment is temporarily held back as the flier rotates in the area of the outer shield. This causes an undesirably loose build up of the coil ends adjacent to the commutator. Loose coil ends are undesirable because they tend to reduce the slot fill obtainable for each coil having a loose end. And, as additional coils are wound, the newly wound coils are forced further from the armature shaft by the loose ends of the previously wound coils.

The presence of the outer shield in the wire path may also obstruct movement of the wire segments forming the coil sides into the bottom of the slots while the coil is being wound.

In accordance with this invention, at the commencement of the winding of a pair of coils in a double flier winder, the outer shield is retracted during a substantial portion of the time during which the coils are being wound. Means are provided for rotating the inner shield prior to retraction of the outer shield to a position in which its notches do not expose any commutator hooks in the paths followed by the wires during winding. Accordingly, the wires will be guided along surfaces of the inner shield. Although the inner shield may only be of slightly smaller diameter than the outer shield, it has been found that coils wound with the outer shield retracted are noticeably more tightly wound and compact and it is thereby possible to achieve a greater slot fill.

It has been previously recognized that the coils wound by a double flier armature winder tend to build up generally along one side of each core slot rather than centrally of the slots. Thus the sides of the first wound coil do not build up in the bottoms of the slots. This undesirably limits the amount of wire that can be wound into the slots when the subsequently wound coils are formed. Since the coil ends span across the ends of the armature in essentially straight paths rather than arcuate paths curving around the armature shaft, the coil ends of the earlier wound coils tend to place a greater limit on the number of turns of the subsequently wound coils.

Further in accordance with this invention, a tamper assembly is provided by which each coil, after it is wound, may be pressed at portions thereof along the coil ends immediately adjacent to the coil sides by tamper members that are guided for movement in paths extending substantially radially from the armature shaft. The tamper members apply pressure that causes the coil sides to be moved into locations that are more centrally located within the coil receiving slots and are deeper, i.e. closer to the armature shaft. By applying pressure in this manner, the coil ends are caused to become more curved. The net effect is to provide more room within the coil receiving slots for the subsequently wound coils and the slot fill potential is further enhanced.

There will be cases in which the armature configuration will not require a tamper means as described above. In other cases, the tamper members will only be needed to apply pressure to a limited number of coils, which may be the first wound coils or some subsequently wound coils. Furthermore, it is contemplated that the tampers of this invention may find application for winding armatures wherein the outer shield need not be retracted when the coils are being wound and in other cases in which separate inner and outer shields are not provided.

This invention was developed particularly for use in forming winding patterns of the type described in U.S. Pat. No. Re. 27,893 granted to Jerry E. Miller on Jan. 22, 1974, wherein armatures are wound with lead wires between coils, each of which extends from the end of a wound coil partially around the armature shaft to a commutator hook, is then looped completely around the hook, and then extends in the same direction around the shaft into a core slot for the next coil to be wound. However, it will be apparent to those familiar with the art that the invention could be used with other winding patterns such as well known "automotive" winding patterns.

Although this invention is expected to be used mostly with double flier winding armature machines, it will be apparent that the benefits hereof would be fully realized when the invention is applied to single flier armature winders.

The primary object of this invention is to provide an improved armature winding machine and method for automatically winding armatures having greater slot fill without substantially increasing the cost of the armature winding machines in comparison with convential machines. Other objects and advantages are apparent from the foregoing discussion and will become apparent from the following description.

BRIEF DESCRIPTION OF THE DRAWINGS

FIG. 1 is a partially diagrammatic and simplified side elevational view of a portion of an armature winding machine in accordance with this invention with the machine control circuitry shown in simplified diagrammatic form. FIG. 1 shows parts of the machine and an armature in readiness for the looping of a lead wire about a commutator hook in preparation for the winding of coils on the armature.

FIG. 2 is a further simplified, side elevational view of parts of the winding machine and the armature of FIG. 1 illustrating the parts after the looping of wire about the selected commutator hook.

FIG. 3 is a side elevational view similar to FIG. 2 illustrating parts in readiness for the winding of a pair of coils.

FIG. 4 is a cross sectional view of the armature taken along line 4—4 of FIG. 3 illustrating an end view of parts of the armature winding machine surrounding the commutator. FIG. 4 also shows the locations of the armature core teeth by broken lines.

FIG. 5 is a side elevational view similar to FIGS. 2 and 3 and showing parts shortly after the commencement of the winding of a first coil by the flier illustrated in FIG. 5.

FIG. 6 is a view similar to FIG. 5 showing the parts at the end of the winding of the first coil.

FIG. 7 is an enlarged, fragmentary cross sectional view of the armature and a first coil wound.

FIG. 8 is a view similar to FIG. 7 illustrating the coil after it has been engaged by a tamper rod which is illustrated by broken lines.

FIG. 9 is an end elevation as viewed from the front of the winding machine, that is the left side of the winding machine as viewed in FIG. 1, with parts omitted for simplification and with parts shown broken away and in cross section and partly illustrating a tamper assembly forming part of the armature winding machine. As with FIGS. 6 and 8, FIG. 9 shows the parts after the first coils are wound.

FIGS. 10 and 11 are simplified side elevational views similar to FIGS. 2, 3, 5 and 6 and illustrating, in sequential fashion, additional steps in the winding of the armature.

DESCRIPTION OF THE PREFERRED EMBODIMENT

Refering to FIGS. 1 through 8, this invention is directed to an improved method and apparatus for winding the type of armature, generally designated 20, having a laminated core 22 and a commutator 24 mounted on an armature shaft 26. The commutator 24 has a plurality of circumferentially spaced commutator segments terminating in hooks 30 adjacent to one end of the laminated core 22. The core 22 has a plurality of radially extending, outwardly opening, coil-receiving slots 32 separated by T-shaped teeth 34 which receive coil windings 36. As well known, the coil windings 36 are wound from insulated wire and the windings 36 are completely isolated from the armature core 22 and the shaft 26 by plural insulating members including U-shaped slot liners 38, insulating core end pieces 40, an insulating sleeve 42 between the core 22 and the commutator 24, and an insulating sleeve 44 adjacent the opposite end of the core 22. After the winding is completed, insulating wedges (not shown) are extended through each of the slots 32 between the windings 36 and the outward openings to the slots 32.

In the particular armature 20 illustrated in the drawings, there are as many commutator hooks 30 as there are slots 32. This type of armature is conventionally known as a "one coil per slot" armature because, when fully wound, there will be as many coils as there are slots. One completed coil 46 is illustrated in FIGS. 6 through 10, the coil 46 comprising plural turns of wire W. With reference to FIG. 6, the coil 46 is generally considered to have side turns 48 extending through a pair of spaced core slots 32 and end turns 50 spanning across the ends of the armature core 22 between the core slots receiving the side turns 48. Since each coil has side turns in two slots, an one coil per slot armature will have the side turns for two coils in each slot. In addition to the coils, the windings 36 comprise start wires, such as those designated 52 in FIG. 4, extending from selected commutator hooks 30 to the start of the first coils wound, lead wires between coils extending to and from the commutator hooks such as that designated 54 in FIGS. 10 and 11, and finish wires extending from the ends of the last coils wound to the same commutator hooks to which the start wires 52 are connected.

With reference to FIGS. 1 and 9, an armature winding machine in accordance with this invention is generally designated 60 and includes left and right side (as viewed in FIG. 9) chucks or winding forms, designated 62 and 64 respectively, that receive the armature 20 between the confronting concavely curved surfaces thereof. The left side winding form 62 is mounted upon a mounting plate 66 having a bearing (not shown) that rotatably receives a flier spindle 68 on which is affixed a left side flier 70. The right side winding form 64 is similarly mounted in a bearing on a mounting plate 72 rotatably receiving a spindle 74 for a right side flier 76. As conventional, wire W is dereeled under tension from a supply spool (not shown) and coursed through the left side spindle 68 around a pulley 78 mounted for rotation thereon and another pulley 80 mounted for rotation at the terminal end of the left side flier 70. Another strand of wire W is drawn under tension from another supply spool (not shown) through the right side spindle 74 around pulley 82 mounted on the right side spindle 74 and around a flier pulley 84 (FIG. 1). As well known to those skilled in the art, the spindles 68 and 74 and, accordingly, the fliers 70 and 76 are simultaneously rotatably driven as by a spindle drive motor M schematically represented in FIG. 1, for winding coils two at a time in spaced coil receiving slots 32.

During the winding procedure, the end of the armature shaft 26 adjacent to the commutator 24 is gripped by a collet 86, the construction and operation of which may be entirely conventional and form no part of this invention. Briefly, the collet 86 may be operated by movement of a collet compression rod 88 which is biased to the left as viewed in FIG. 1, by spring means (not shown) to cause the collet 86 to grip the armature shaft 26. The grip of the collet 86 may be released by moving the collet compression rod 88 away from the collet 86, i.e. to the right as viewed in FIG. 1, by operation of a collet operating cylinder 90 which acts on a spring biased drive link 92 adapted to engage a sliding collar 94 that engages and moves the collet compression rod 88.

In preparation for winding the coils and during the winding cycle, the armature must be rotated as necessary to properly align its coil receiving slots with the winding forms 62 and 64 and to enable the appropriate connections to the commutator hooks to be made. Various forms of armature rotator devices may be used for this purpose and the details of construction and operation thereof form no part of this invention. One such rotator device is shown for example in the U.S. Pat. No. 3,673,878 issued to John M. Biddison on July 4, 1972. (The Biddison patent also discloses a collet assembly that could be used in lieu of that described above.) A preferred form of armature rotator device is shown in FIG. 1 that includes a stepping motor which, through gears 102, drives a rotator spindle 104 that is hollow to receive the collet compression rod 88. The spindle 104 and the compression rod 88 are appropriately mounted for rotation within front and rear frame plates 106 and 108, respectively, of a rotator support frame including a base plate 110, a frame brace plate 112, and a frame top plate 114. The rotator spindle 104 has a reduced diameter portion located in front of the front frame plate 106 to which is clamped, by a clamping ring 116, a collet retainer 118. Accordingly, and as more fully described in the above mentioned Biddison U.S. Pat. No. 3,673,878, the collet 86 when engaged with the armature shaft will be caused to rotate with the rotator spindle 104.

The armature winding machine 60 of this invention further includes a commutator shield assembly generally designated 120 comprising an inner shield 122 and an outer shield 124. The inner shield 122 comprises a hollow, cylindrical body member that surrounds the commutator 24 and has a pair of opposed notches 126 in its forward end, i.e. the end closest to the winding forms 62 and 64. The purpose of the notches 126 is to expose the two diametrically opposed commutator hooks 30 located in the generally horizontal plane at which are referred to as the "3:00" and the "9:00" positions when coil lead wire connections are to be made to the hooks 30. In prior winders, such as that disclosed in the aforementioned Biddison U.S. Pat. No. 3,673,878, the inner shield is located in a fixed position, moving neither axially nor rotatably. In accordance with this invention, the inner shield 122 has a rearwardly extending portion 128 that may optionally be of an enlarged diameter that is surrounded by a pinion 130 affixed thereto and drivingly engaged by a rack 132 driven by an inner shield rotating cylinder 134. The inner shield assembly comprising the inner shield 122 and the pinion 130 are held in an axially fixed position by a bifurcated guide plate 136 having a notch between the bifurcations thereof in which the pinion 130 is trapped in a manner to prevent axial movement thereof.

Movements of the outer shield 124 in accordance with this invention are different from outer shield movements typical in prior armature winding machines, but the manner in which the outer shield 124 is mounted and moved may be conventional. Thus the outer shield 124 is advanced and retracted from a commutator hook shielding position by a shield actuator cylinder 138 mounted on the front frame plate 106 and having a piston rod 140 connected to a bracket 142 that is connected to or integral with the outer shield 124. The sequence of movements of the outer shield 124 toward and away from its commutator hook shielding position will be described below.

The armature winding machine 60 of this invention is additionally provided with apparatus for severing the start and finish wires of the armature windings of the type described in U.S. Pat. No. 3,812,577 granted to Jerry L. Compton and David R. Seitz on May 28, 1974. Accordingly, there is diagrammatically shown in FIG. 1 a wire clamp 150 which is operable to clamp the wire and which is mounted and moveably driven as described in said U.S. Pat. No. 3,812,577, to pull the wire to cause the portion of the wire between the commutator and the clamp 150 to be severed against the edge of the commutator hook about which the wire is looped. As with many other parts of the armature winding machine 60, the details of operation and construction of the clamp 150 are unimportant to this invention and such may be fully in accordance with prior practice. Here it may be noted that the machine 60 also includes another wire clamp (not shown) which is used in association with the left side flier 70 and which is identical to the clamp 150.

With reference to FIG. 9, the winding forms 62 and 64 may, as is conventional, comprise side plates 152 and 154 affixed to a winding form center piece 156.

In accordance with this invention, a tamper assembly, shown best in FIG. 9, is associated with the winding forms 62 and 64. The tamper assembly comprises eight identical tamper rods, only four of which can be seen in FIG. 9, mounted in the winding forms 62 and 64 for slideable movement along axes extending substantially radially of the longitudinal axis of the armature 20 located within the winding forms. The tamper rods are guided for movement in planes located at opposite ends of the armature. Thus, there is an upper left side tamper rod 160 guided for movement in a groove 152a formed in the winding form side plate 152 most remote from the viewer in FIG. 9. There is a corresponding tamper rod which is similarly located in a groove in the left side winding form side plate 154.

The tamper rod 160 comprises an elongate strip or plate member having a slot 160a receiving a pin 161 affixed to the winding form 62 and enclosing a spring 162 that functions to bias the tamper rod 160 away from the armature 20. The end of the tamper rod 160 nearest the armature 20 has a reduced width and forms a pressure foot 160b adapted to engage the uppermost near end of a coil that was wound in the armature core 20 utilizing the left side winding form 62. The construction and operation of the pressure foot 160b is such that, when the tamper rod 160 is moved toward the armature 20, the foot 160b engages the upper near end of a coil just wound so that the uppermost coil side 48 is caused to be moved generally radially inwardly toward the armature shaft 26 and thus more deeply into its core slot 32 and also to be moved more centrally with respect to a plane extending radially from the armature shaft through the center of the slot 32. Both the tamper rod 160 and the other upper left tamper rod are preferably simultaneously moved to engage both coil ends 50 and, for this purpose, the two rods are innerconnected by a tamper rod connector 164 connecting the radially outermost and uppermost ends thereof and adapted to be engaged by a force applying shoe 166 connected to the piston rod 168 of a tamper actuating cylinder 170. A lower left side tamper actuating cylinder 172 is similarly provided to engage a pair of spring biased tamper blades 174 located in the lower portion of the left side winding form 64, only one of which is visible in FIG. 9. The right side winding form 64 is similarly provided with an upper pair of tamper rods 176 biased by springs (not shown), corresponding to the spring 168, away from the armature 20 and innerconnected by a tamper rod connector 178 located in the path of movement of a force applying shoe 180 driven radially with respect to the armature core 20 by a tamper actuating cylinder 182. Finally, the right side winding form 64 is provided with a lower pair of tamper rods 184 connected by a tamper rod connector 186 in the path of movement of a force applying shoe 188 driven by a tamper rod actuator cylinder 190.

The apparatus of this invention described above may be used in winding an armature in the following manner. After one armature has been fully wound and removed from between the winding forms, the winding forms are spread apart so that an unwound armature, such as the armature 20 may be positioned in readiness to be wound. The unwound armature is gripped by the collet 86 and appropriately oriented relative to the winding forms so that the winding of the armature can commence. It is to be understood that both fliers 70 and 76 are rotated simultaneously for forming lead wire connections and for winding coils. The following description is with reference to the right side flier 76 only, the left side flier undergoing the same movements but rotating in the opposite direction.

In FIG. 1, the phantom lines 76a show the stop position of the flier 76 at the end of the winding of an armature. This is the "upper stop" position and is above a horizontal plane containing the armature shaft. After the unwound armature is gripped by the collet 86, the flier 76 is rotated in a clockwise direction as viewed in FIG. 1 so that the wire extends from the clamp 150 to the flier pulley 84 between the commutator 24 and the core 22. This is the position shown by full lines in FIG. 1. The outer shield 124 is then retracted by energization of its actuator 138 under control of the Machine Control Circuitry so that the commutator hooks 30 exposed by the inner shield notches 126 are now fully exposed as shown in FIG. 1. The flier 76 is then rotated in a counterclockwise direction as indicated by the heavy arrow in FIG. 1 to cause the wire to be hooked behind the commutator hook 30. To accomplish this hooking operation, wire lead guides (not shown) of the type disclosed in U.S. Pat. No. 3,713,598 granted to Glen E. Bucholtz and James N. Doyle on Jan. 30, 1973, may be employed to force the wire to extend behind the commutator hook 30. The lead guides would be moved away from the hooks after each hooking operation.

With reference to FIG. 2, the outer shield 124 is extended forwardly into covering relation to the commutator hooks and the flier 76 rotated again in the clockwise direction as indicated by the heavy arrow in FIG. 2, whereupon the wire segment between the clamp 150 and the flier pulley 84 is completely looped around the commutator hook. The step of hooking the wire behind the commutator hook is repeated in preparation for the forming of a second loop about the commutator hook in accordance with the invention described in U.S. Pat. No. 3,713,208 granted to James N. Doyle on Jan. 30, 1973, and the outer shield is again extended to completely cover the commutator. At this time, the wire clamp 150 may be abruptly moved away from the commutator whereupon the wire segment leading to the clamp 150 is severed adjacent the commutator hook as described in the aforementioned Compton et al. U.S. Pat. No. 3,812,577. The armature 20 is then rotated by the armature rotator assembly in a "top-going" direction (as indicated by the arcuate arrows associated therewith in FIG. 3) to position the armature 20 in a location, such as shown in FIGS. 3 and 4, in preparation for the winding of the first pair of coils. Before the winding commences, the inner shield 122 is rotated in a "top-coming" direction, as indicated by the arcuate arrow associated therewith in FIG. 3, to move the inner shield notches 126 out of the paths that the wires will follow during the subsequent winding of the coils. The parts are now in the position shown in FIGS. 3 and 4.

Immediately thereafter the winding of the first coils commences as illustrated. FIG. 5, the speed of rotation of the flier increases until it reaches a maximum or "high" speed. When the high speed is reached, usually after approximately three-fourths to one complete rotation, the outer shield 124 is retracted, as indicated by the heavy arrow in FIG. 5, in a direction away from the armature core 22 and out of the paths followed by the wires when the coils are wound. During the succeeding rotation of the flier 76 the wire segment between its pulley 84 and the core 22 will be cammed over the surfaces of the inner shield 122. These inner shield surfaces are located closer to the armature shaft 26 than are the end surfaces of the outer shield 124 when in its extended, commutator covering position. Accordingly, the wire segments are not so drastically impeded by engagement of the inner shield 122 as they are when engaging the outer shield 124. The coils are therefore wound more compactly without loose ends, and the coil sides 48 are drawn more deeply into the coil receiving slots 32.

Following the winding of the first coil 46, the flier 76 is stopped in its normal, lower stop position illustrated in FIG. 6, which is below the horizontal plane containing the axis of the armature shaft 26. FIG. 7 shows a typical configuration for the coil 46 as viewed from the end of the core 22 opposite from the commutator 24. It will be observed that the several turns of wire W forming the coil 46 are located substantially off center, i.e. to one side of an imaginary line extending centrally through its coil receiving slot 32 and radially of the armature shaft 26. Thus, the wire turns tend to pile up on one side of the core slots 32 in which the coil sides 48 are located. To provide for a greater slot fill, the tamper mechanism may be energized to thereupon cause the several tamper rods to engage the coil ends 50 immediately adjacent the coil sides 48 with the result that, as shown in FIG. 8, the coil sides 48 are pushed into a more central location within the slots 32 and are also pushed deeper into the core slots 32, i.e. closer to the armature shaft 26. A further result of the application of pressure by the tamper rods is that the coil ends 50 are compacted towards the armature shaft 26 whereupon the empty coil receiving slots 32 which they span are less obstructed by the coil ends 50 to provide more room within the slots for receiving the subsequently wound coils and also to reduce the obstruction provided by the coil ends to the build up of the coil ends of subsequently wound coils.

It will be noted in FIG. 8 that coil portions, one of which is shown at 200, may be reshaped or partially buckled as a result of the pressure applied by the tamper rods. Provided that such extreme pressures are avoided that would cause the insulating coatings on the wires to be disrupted, this reshaping of the coils does not harm the coils and beneficially provides additional space in the adjacent empty coil receiving slots 32. The location of one of the tamper rods 176 is indicated at 176a in FIG. 8 at the time of application of maximum pressure. It will be understood that all of the tamper rods will be engaged with their associated portions of the coil ends at the same time.

After the tamping operation described above, the armature rotator is again energized to rotate the armature in a top-going direction thereby to locate the commutator hook 30 to which the wire lead extending from the end of the first wound coils is to be connected at the 3:00 position as shown in FIG. 10. The inner shield is reversely rotated, i.e. rotated in a top-going direction, so that it returns to the position shown in FIG. 10 wherein an inner shield notch 126 exposes the last mentioned commutator hook. The flier 76 is then reversely rotated to its upper stop position to extend the wire from the end of the first wound coil behind the exposed commutator hook 30. The outer shield 124 is then extended into covering relation to the commutator 24 and the armature rotator assembly energized to again rotate the armature in a top-going direction to position the armature in a location to receive the next coil to be wound by the flier 76, during which rotation of the armature the wire lead 54 is completely looped about the commutator hook 30 shown exposed in FIG. 10.

After the parts reach the position thereof shown in FIG. 11, the second coil or pair of coils is wound and, as before, during the initial portion of the winding cycle the outer shield 124 is retracted so that it is removed from the paths of the wire segments between the fliers and the armature core. The same commutator hooking and looping operations are repeated intermittently with a winding of coils until the armature is fully wound. Thereafter, by appropriate relative motions of the armature, the fliers, and the inner and outer shields, the wire portions leading from the last wound coils are partly looped about the same commutator hooks around which the start wires are looped, these being the commutator hooks as shown with wire looped about them in FIG. 4. The wire segments between these hooks and the fliers are again clamped by the clamp devices and severed by operation of these devices as is known or will be apparent to those familiar with armature winding machines.

In many cases it will be necessary or at least desirable that each end of each coil is tamped as described above immediately after it is wound. However, there may be instances wherein not all the coils will be tamped. With some armature designs it may be necessary to tamp only the first pair of coils wound or perhaps only the last pair of coils wound or some other pair of coils. The coils that need to be tamped can be determined by trial and error. Also it may be possible in some cases to cause the coils to be tamped adjacent only one end of the armature. Although each upper and each lower set of tamper rods is shown connected so that they will both be moved in response to pressure applied by only a single actuator, other arrangements can readily be imagined. For example, each tamper rod could have its own actuator or, as an alternative, means could be provided for causing both upper sets of tamper rods (and both lower sets) to be moved toward the armature by a single actuator with a suitable linkage connecting the two sets of tamper rods. In every case, it is expected that it will be necessary for the actuators, such as the cylinders 170, 172, 182 and 190 to be located remotely from the winding form so as not to obstruct rotation of the fliers as they are rotating to wind coils.

This invention may be used with inner and outer shield constructions of various different designs. However, it is important that the inner shield be constructed such that it is sized and located to surround the commutator hooks (except in the area of the notches 126) to prevent the wire segments between the fliers and the core 22 from engaging the commutator hooks 30 during the winding of the coils. It will also be apparent that the outer shield may have various different constructions consistant with its function of assisting in the looping of the wire leads about the commutator hooks. For most armature winding applications, the outer diameter of the outer shield will be on the order of one-eighth to one-quarter inch greater than the outer diameter of the inner shield yet it has been found beneficial as described above to move the outer shield so that none of its surfaces will be engaged by the wire segments between the fliers and the armature core during substantial portions of the cycles in which coils are being wound.

The invention described above is with reference to the winding of a two pole armature having one coil per slot. The invention could also be used with other types of armatures, for example those having two coils per slot, or four pole armatures. This invention is deemed especially beneficial for use in winding four pole armatures because of the short coil span of such armatures.

It is expected that in perhaps every case both aspects of this invention, namely the retraction of the outer shield during the winding of the coils and the tamping of at least some of the coils by tamper rods slidably supported by the winding forms will need to be used to obtain maximum slot fill. However, either one of these features could be used to advantage without use of the other feature in many winding applications.

Althought the presently preferred embodiment of this invention has been described, it will be understood that various changes may be made within the scope of the appended claims.

Having thus described my invention, I claim:

1. For use with a flier-type armature winder having a rotatable flier, a commutator shield assembly including an inner shield having a notch for exposing a commutator hook to enable connection of coil lead wires to said hook and an outer shield that assists in looping a lead wire about said hook and in preventing wire from engaging a hook during intervals in which said flier is rotating, the improved method comprising the steps of:

(1) rotating the inner shield to position said notch out of the path of the wire followed when a coil is being wound;

(2) rotating said flier to wind a coil, moving the outer shield to remove it from said path so that the wire used in winding the coil will be drawn deeper into the coil receiving slots as the flier rotates;

(3) rotating said inner shield to position said notch in a location wherein it exposes a commutator hook in said path so that said wire may be engaged with said hook by rotating said flier after said coil is wound; and (4) extending said outer shield toward said coil into covering relation to said notch.

2. The method of claim 1 further comprising the steps of moving the side turns of said coil more deeply into said coil receiving slots and more centrally of said coil receiving slots immediately after the winding of said coil.

3. The method of claim 2 wherein said side turns are moved by engaging at least one of the end turns of said coil by tamper members moving along paths extending substantially radially of the shaft of said armature.

4. The method of claim 3 wherein both end turns of said coil are each simultaneously engaged by two of said tamper members to move said side turns.

5. The method of claim 1, 2, 3, or 4 wherein said inner shield is rotated by actuation of rotary drive means engaging said inner shield.

6. The method of claim 5 wherein said machine comprises two fliers and wherein there are two coils wound simultaneously, one by each flier, and wherein said inner shield has a pair of diametrically opposed hook-exposing notches.

7. In a flier type armature winder having a commutator shield assembly including an inner shield having a notch for exposing a commutator hook to enable connection of coil lead wires to said hook and an outer shield that assists in looping a wire about said hook and preventing wire from engaging a hook during intervals in which said flier is rotating, the improvement comprising means for rotating the inner shield to position said notch out of the path of the wire followed when a coil is being wound, and means for moving said outer shield to a position during the winding of coils in which its surfaces are out of said path of the wire.

8. The improvement of claim 7 further comprising tamper means for engaging the ends of the wound coils adjacent the coil sides for pressing the engaged portions of said coil ends generally toward the armature shaft thereby causing the coil sides to be located more centrally of and deeper in the armature core slots receiving them.

* * * * *